March 31, 1925. Re. 16,032
J. M. HOPWOOD
REGULATING COMBUSTION IN GAS FIRED FURNACES
Original Filed Nov. 15, 1920
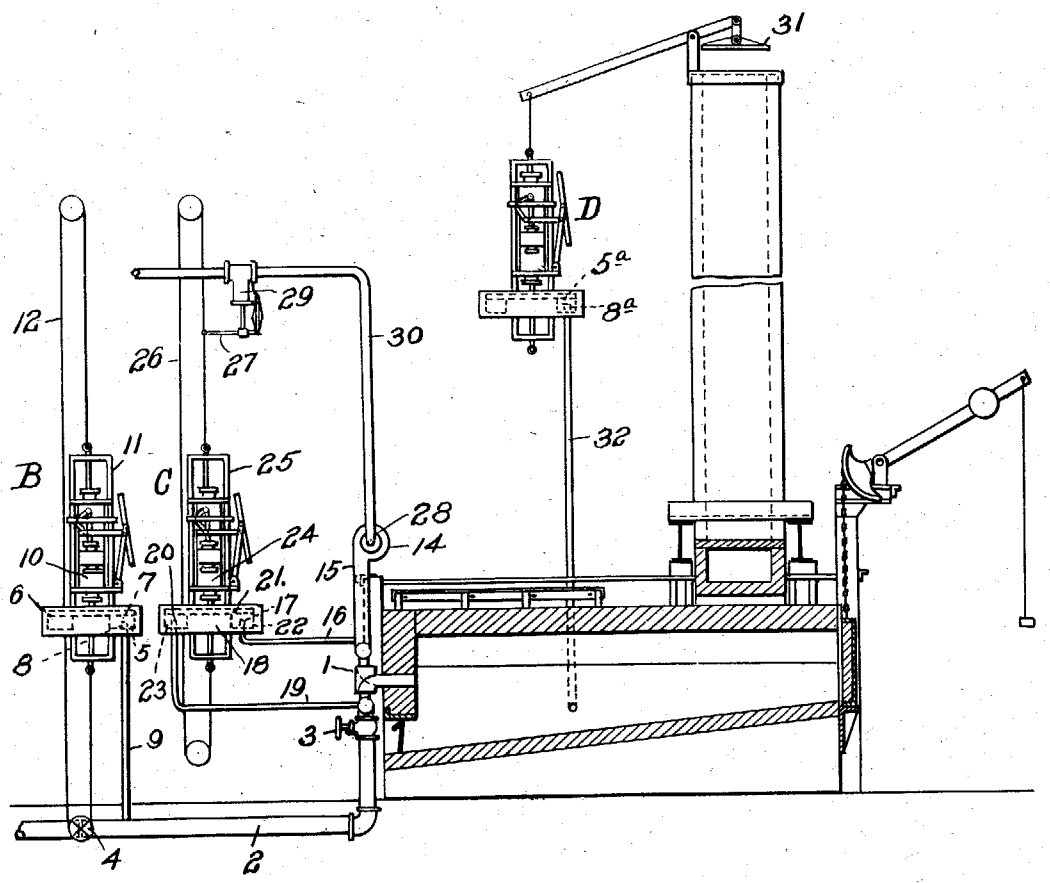
INVENTOR
John M. Hopwood
by Green McCallister
attorneys in fact.

Reissued Mar. 31, 1925. Re. 16,032

UNITED STATES PATENT OFFICE.

JOHN M. HOPWOOD, OF DORMONT, PENNSYLVANIA.

REGULATING COMBUSTION IN GAS-FIRED FURNACES.

Original No. 1,445,684, dated February 20, 1923, Serial No. 424,142, filed November 15, 1920. Application for reissue filed December 6, 1924. Serial No. 754,442.

*To all whom it may concern:*

Be it known that I, JOHN M. HOPWOOD, now a resident of Dormont, in the county of Allegheny, State of Pennsylvania, but formerly a resident of Pittsburgh, in said county and State, and a citizen of the United States, obtained Patent No. 1,445,684 on Feb. 20, 1923; and whereas, said patent is inoperative in that it does not fully and completely cover my invention of Improvements in Regulating Combustion in Gas-Fired Furnaces disclosed thereby, the following is a complete specification thereof.

In the operation of furnaces especially metallurgical furnaces, it is frequently necessary to change the heat in the furnace, such heat being varied with the character and size of the material and article being heated, and the treatment to which such article or material is to be subjected subsequent to heating. When employing gas for heating the furnace, it is the general practice to make inlet ports of fixed dimensions and to regulate the flow of gas through such ports by hand operated means. Hence as the pressure of the gas is subjected to sudden and large changes in pressure it frequently occurs that after the hand regulating valve has been adjusted to admit the necessary quantity of gas at the then existing pressure, in the supply pipe, there will be a change of pressure and a consequent undesirable change in the rate of combustion in the furnace.

The invention described herein has for its object the provision of suitable means whereby the pressure of gas at the inlet side of the hand regulating valve will be constant regardless of any increase or decrease of pressure in the supply conduit. It is a further object of the invention to provide for the regulation of the supply of air for the combustion of the gas by and in accordance with changes in pressure of the gas posterior to the regulating valve. The invention also has for its object the maintenance of a substantially uniform pressure of gases in the furnace to prevent the infiltration of air. The invention is hereinafter more fully described and claimed.

In the accompanying drawings forming a part of this specification, is shown a sectional elevation of a metallurgical furnace having my improvements applied thereto.

As shown in the drawing gas is supplied to the burner 1 which extends into the furnace through a conduit 2, the quantity admitted to the furnace being regulated to suit requirements by a suitably operated valve 3, preferably hand operated. The areas of the ports and passages of the burner being fixed, the adjustment of the valve 3 will determine the supply of the gas to furnace so long as there is no variation from the pressure of gas in the conduit at that time, but if the pressure rises or falls there will be a corresponding change in the quantity of gas flowing into the furnace and a consequent inefficient combustion in the furnace. In order to ensure the maintenance of a uniform pressure anterior to the hand operated valve 3, a valve 4 is arranged in the gas supply conduit and suitable mechanism is employed for automatically adjusting this to maintain a uniform pressure between it and the hand operated valve 3. A desirable construction for this purpose is indicated at B, and is fully described and shown in Figs. 3 and 4 of Letters Patent No. 1,338,923, dated May 4, 1920. Generally stated, this mechanism consists of an inverted cup 5 suspended in a tank 6 from one end of lever 7. A nozzle 8 which is connected by pipe 9 to the conduit 2 at a point posterior to the valve 4, projects up into the cup; a second inverted cup is suspended from the opposite end of the lever for the purpose of counterbalancing the cup 5 and also preventing excessive movements of the latter. The lever is connected to a pilot controlling the flow of fluid pressure to and from the cylinder 10, the piston of which is connected to a frame 11. This frame is operatively connected by a cord 12 to the valve 4. Any change from the desired pressure in the conduit posterior to the valve 4 will cause such a movement of the mechanism B as to shift the valve 4 in a direction to restore the pressure to the desired point in the conduit posterior to valve 4.

As will be understood by those skilled in the art, it will be necessary in order to maintain efficient combustion in the furnace, that the flow of air for combustion should vary with the flow of gas through the burner, and to this end provision is made for automatically varying the supply of air as the valve is shifted to effect a change of temperature in the furnace.

The air for combustion is preferably supplied at super atmospheric pressure and in the construction is supplied by a fan 14 having its outlet connected by a pipe 15 to the mixing chamber of the burner 1. In order to regulate the flow of air to the burner the air conduit is connected by a pipe 16 extending from a point intermediate the fan and burner to a nozzle 17 projecting up into the tank 18, and a pipe 19 connects the gas supply pipe at a point intermediate the valve 3 and the burner to a nozzle 20 also extending up into the tank. Within this is mounted a lever 21 having inverted cups 22 and 23 so suspended therefrom that the nozzles 17 and 20 will project into the cups and extend above the surface of the liquid in the tank. To the lever is connected the stem of a valve mechanism controlling the flow of fluid pressure to and from both ends of a cylinder 24 having its piston rod connected to a frame 25. A cord 26 passing around guide pulleys is connected to the frame and to a lever 27 adapted to control the operation of the fan motor indicated at 28, which may be of any suitable type or construction. In the construction shown the motor being of a type operative by fluid pressure, the lever 27 is connected to the movable member of a valve mechanism 29 in the pipe 30 connecting the fan motor to a suitable fluid pressure generator.

In most heat treating operations it is desirable to prevent oxidation of the articles being heated and to this end a non-oxidizing flame is employed as the doors of the furnace cannot be kept sufficiently tight to prevent the inflow of air, but as it is practically impossible to prevent the inflow of air through cracks in the furnace wall and past badly fitting doors in case the pressure in the furnace should drop materially below atmospheric pressure, automatic means are preferably employed to maintain the furnace pressure at such a point as will prevent material in filtration of air, preferably slightly above atmospheric pressure. In the construction shown the furnace pressure regulating means consists of a damper 31 controlling the escape of gases from the furnace stack and mechanism indicated at D for adjusting said damper and adapted to be regulated in its operation by and in accordance with the pressure of gases in the furnace. While any regulating mechanism suitable for the purpose may be employed, it is preferred to use mechanism substantially identical with the mechanism B and shown and described in Letters Patent No. 1,338,923 hereinbefore referred to, the nozzle 8ª which projects up into the inverted cup 5ª being connected by a pipe 32 to the furnace.

I claim herein as my invention:

1. The combination with a furnace, of a burner for the admission of gas and air to the furnace, a gas conduit connected to the burner, a valve for regulating the flow of gas to the burner, means for maintaining a constant pressure in the gas conduit anterior to said valve and means operative by and in accordance with the pressure of the gas posterior to the valve for regulating the supply of air for combustion to the burners.

2. The combination of a furnace, a burner for the admission of gas and air to the furnace, a gas conduit connected to the burner, a valve for regulating the flow of gas to the burner, means for maintaining a constant pressure in the gas conduit anterior to said valve, means operative by and in accordance with the pressures of the gas posterior to the valve for regulating the supply of air for combustion to the burners, and means for maintaining a substantially constant pressure in the furnace.

3. The combination with a furnace, of a burner for the admission of gas and air to the furnace, a gas conduit connected to the burner, a manually operated valve for regulating the flow of gas to the burner, means for maintaining a constant pressure in the gas conduit anterior to said valve, and means responsive to variations in the quantity of gas delivered by said valve for regulating the supply of air for combustion to said burners.

4. The combination with a furnace, of a burner for the admission of gas and air to the furnace, a gas conduit connected to the burner, a manually operated valve for regulating the flow of gas to the burner, means for maintaining a constant pressure in the gas conduit anterior to said valve, means responsive to variations in the quantity of gas delivered by said valve for regulating the supply of air for combustion to said burners, and means for maintaining a substantially constant pressure in the furnace.

5. The combination with a furnace, of a burner for the admission of gas and air to the furnace, a conduit for delivering gas to said burner, a manually-operated valve for controlling the delivery of gas from said conduit to said burner, means for maintaining a definite pressure at the outlet of said burner, means for delivering variable quantities of air to said burner, and means responsive to variations in the quantity of both the air and gas delivered to said burner for controlling said air delivery means to produce variations in the quantity of air delivered to said burner, corresponding to variations in the quantity of gas delivered to said burner and occasioned by adjustments of said manually-operated valve.

6. The combination with a furnace, of a burner for the admission of gas and air to the furnace, a substantially constant source of gas supply, a manually-operated valve for controlling the delivery of gas from said source of supply to the burner, means for delivering air to the burner, and means responsive to the quantity of air delivered to said burner and controlled by variations in the quantity of gas delivered to said burner, occasioned by adjustments of said manually operated valve, for controlling said air delivery means to produce corresponding variations in the quantity of air delivered to said burner.

7. The combination with a furnace, of a burner, separate connections for delivering the two components of a combustible mixture to said burner, a valve in one of said connections for controlling the delivery of one of said components to the burner, means for delivering variable quantities of the other component to said burner, and means controlled by varying conditions, within the connections including said valve and occasioned by manipulation of said valve, and responsive to variations in conditions occasioned by said component delivery means, for controlling the operation of said component delivery means, and means for maintaining a substantially constant pressure within the furnace.

8. The combination with a furnace, of a burner, a conduit communicating with a substantially constant source of gas supply and with said burner, a valve in said conduit, means for delivering variable quantities of air to said burner, and means responsive to variations in the flow of gas to said burner occasioned by manipulation of said valve, and to variations of air flow to said burner, for controlling the operation of said air delivery means to maintain substantially constant proportions of air and gas to said burner for all adjustments of said valve.

In testimony whereof, I have hereunto set my hand this 29th day of November, 1924.

JOHN M. HOPWOOD.